United States Patent [19]

Schmid et al.

[11] Patent Number: 4,817,728
[45] Date of Patent: Apr. 4, 1989

[54] IMPLEMENT STRUCTURE FOR FACILITATING EASY MOUNTING TO AND DISCONNECTION FROM A LAWN AND GARDEN TRACTOR

[75] Inventors: Steven L. Schmid, Agency; Larry D. Hining; Frank K. O'Toole, both of Ottumwa, all of Iowa

[73] Assignee: Deere & Company, Moline, Ill.

[21] Appl. No.: 76,638

[22] Filed: Jul. 23, 1987

[51] Int. Cl.$^4$ ............................................. A01D 35/12
[52] U.S. Cl. ....................................... 172/273; 56/15.6; 56/DIG. 22; 172/817; 172/810; 280/496; 37/244; 37/231; 37/271
[58] Field of Search ................ 172/272, 274, 273, 275, 172/817, 832, 810, 834; 56/DIG. 22, 15.6, 15.9; 37/231, 244, 241, 271; 280/760, 496, 495; 180/19.1

[56] References Cited

U.S. PATENT DOCUMENTS

| | | | |
|---|---|---|---|
| 2,489,274 | 11/1949 | Donald | 56/15.6 |
| 2,662,459 | 12/1953 | Shore | 172/274 X |
| 2,787,944 | 4/1957 | Meyer | 172/274 X |
| 3,426,458 | 2/1969 | Spitzer | 37/271 |
| 3,508,386 | 4/1970 | Borchardt | 56/15.9 |
| 3,796,028 | 3/1974 | Federspiel | 172/273 |
| 3,815,687 | 6/1974 | Federspiel | 172/817 |
| 3,948,025 | 4/1976 | Erdman | 172/273 |
| 4,600,070 | 7/1986 | Thurner | 172/272 |
| 4,747,612 | 5/1988 | Kuhn | 172/275 |

Primary Examiner—Richard J. Johnson

[57] ABSTRACT

Implements designed for attachment to a lawn and garden tractor include elongate attaching frames having the implement tool connected to first ends of the frames and transport wheels located so that the weight of the implement is distributed approximately half on opposite sides of the wheel axes so that the implement may be easily pushed about on the wheels during mounting and dismounting the implement to and from the tractor frame. Attachment brackets and lift links of the implements are engageable with attachment pins and lift crank arms of the tractor without necessitating any lifting of the implement. Also with driven implements, the drive belts are arranged on or stored with the implements so that the tractor drive may be easily and correctly connected.

12 Claims, 9 Drawing Sheets

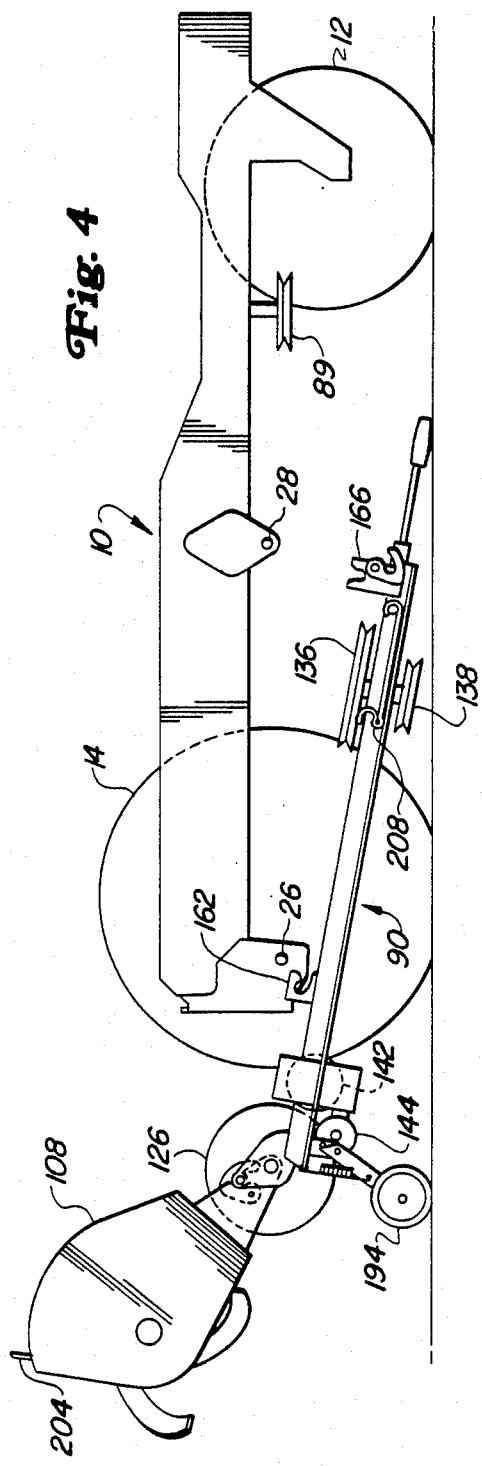
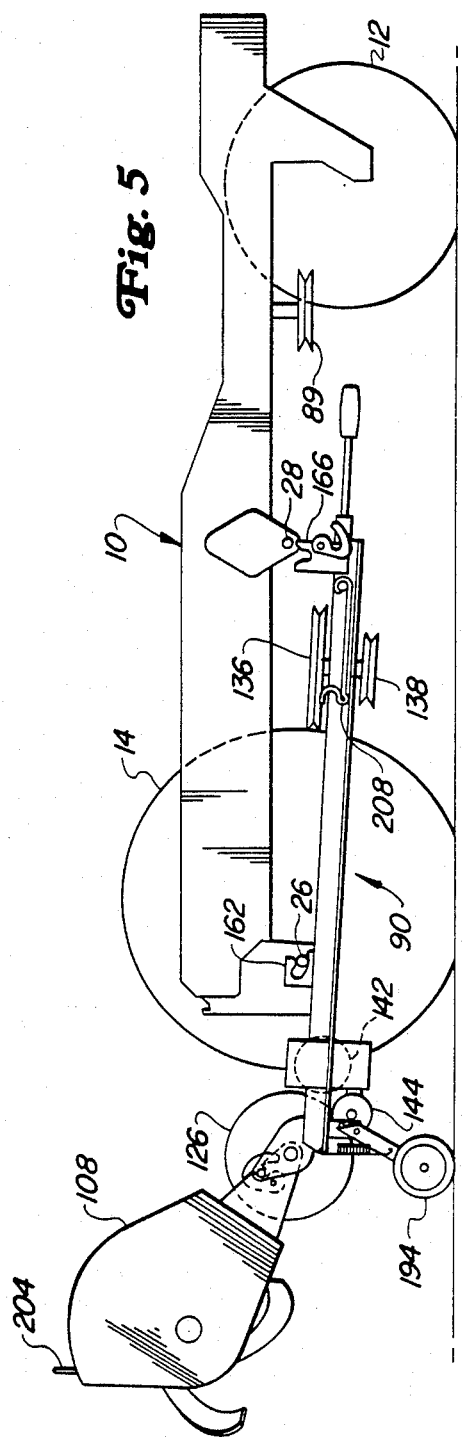

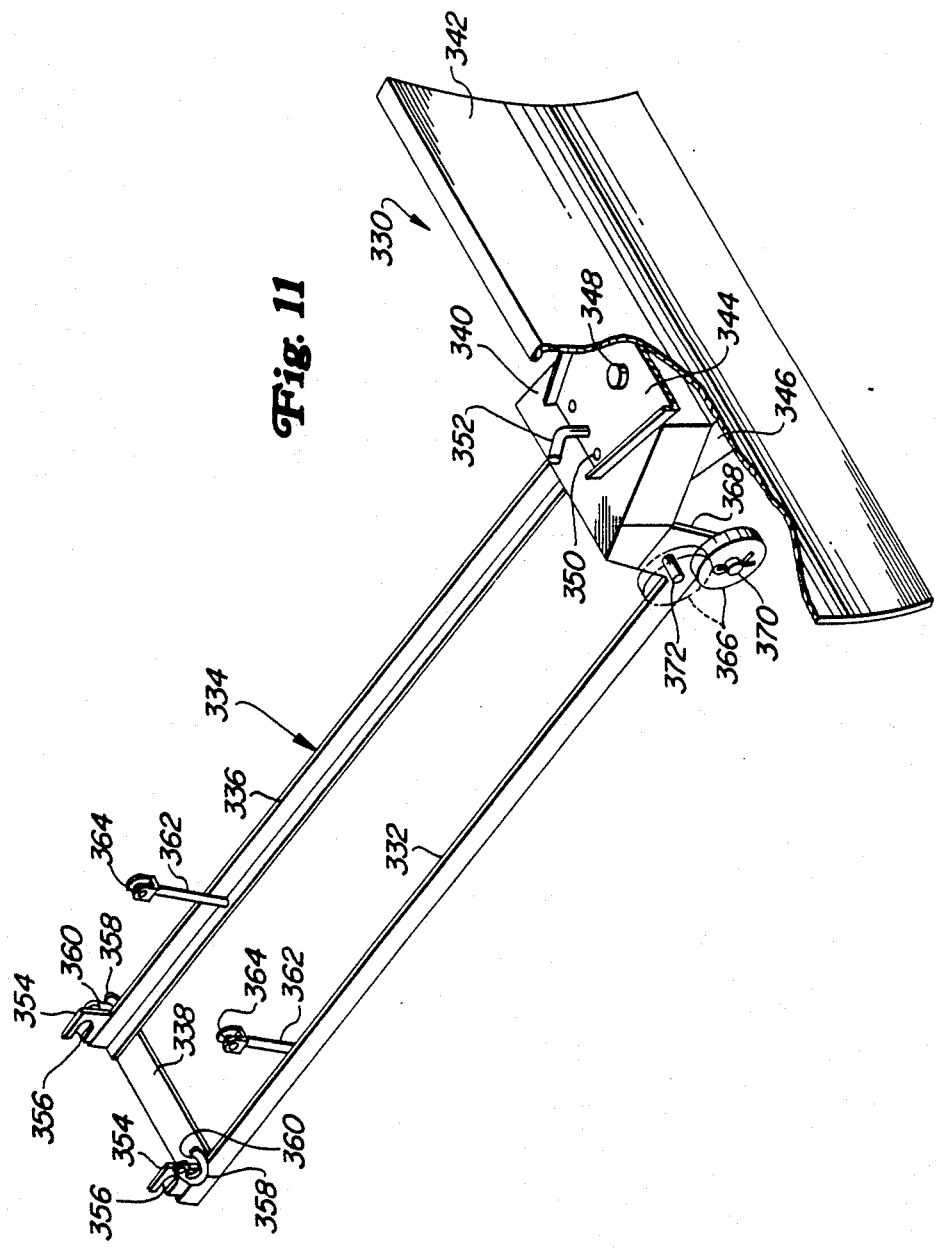

4,817,728

IMPLEMENT STRUCTURE FOR FACILITATING EASY MOUNTING TO AND DISCONNECTION FROM A LAWN AND GARDEN TRACTOR

BACKGROUND OF THE INVENTION

The present invention relates to implements such as rotary tillers, snowblowers or scraper blades designed for being carried by and for operating either at the front or rear of a small tractor such as a lawn and garden tractor, for example. More specifically, the present invention relates to the mode of mounting such implements to a tractor.

Current implements that are attached to a lawn and garden tractor for operating either at the rear or front of the tractor are typically heavy and awkward to handle. This makes it difficult for one person to install, remove and store these implements. Some of these implements have belt drives that are difficult to install and properly tension. Further, many installations require tools and require from thirty to sixty minutes to accomplish.

SUMMARY OF THE INVENTION

According to the present invention there is provided novel structure incorporated in implements to facilitate their mounting on lawn and garden tractors.

An object of the invention is to provide an implement incorporating structure permitting one person to easily and quickly mount the implement to and disconnect the implement from a lawn and garden tractor.

A more specific object is to provide an implement as defined in the previous object which may be mounted to or disconnected from a lawn and garden tractor without lifting the implement.

Yet another object of the invention, in addition to those set forth above, is to provide an implement of a species requiring a belt drive, with a belt arrangement facilitating easy, error-free connection of a drive belt with an output pulley carried by the tractor.

A more specific object is to provide an implement with a set of wheels for supporting the implement during the mounting of the latter to a tractor, the wheels being located adjacent the center of gravity.

Yet another specific object relating to belt-driven implements is to either provide the implement with a secondary drive belt that remains in place on the implement when the latter is disconnected from the tractor, with connection of a primary drive belt to a tractor drive pulley being a single loop connection, or to provide the implement with a primary drive belt that is captured on the implement by belt guides when the implement is disconnected from the tractor, with a loop of the belt then being established for easy connection to the tractor drive pulley when mounting the implement to the tractor.

These and other objects, features and advantages of the present invention will become apparent to those skilled in the art from the description which follows and from the drawings.

BRIEF DESCRIPTION OF THE DRAWINGS

FIGS. 4–7 are right side elevational views of the tiller and tractor frame, with portions removed for clarity, showing a sequence of the positions to which the tiller is moved when mounting the latter to the tractor frame.

FIG. 8 is a right front perspective view of a snowblower adapted for mounting to the tractor frame shown in FIG. 1a.

FIG. 11 is a right front perspective view of a blade adapted for mounting to the tractor frame shown in FIG. 1a.

DESCRIPTION OF THE PREFERRED EMBODIMENT

It is to be noted that the specific implements described herein are only illustrative of the types of implements that can usefully embody the principles of the present invention.

Figure 1A:
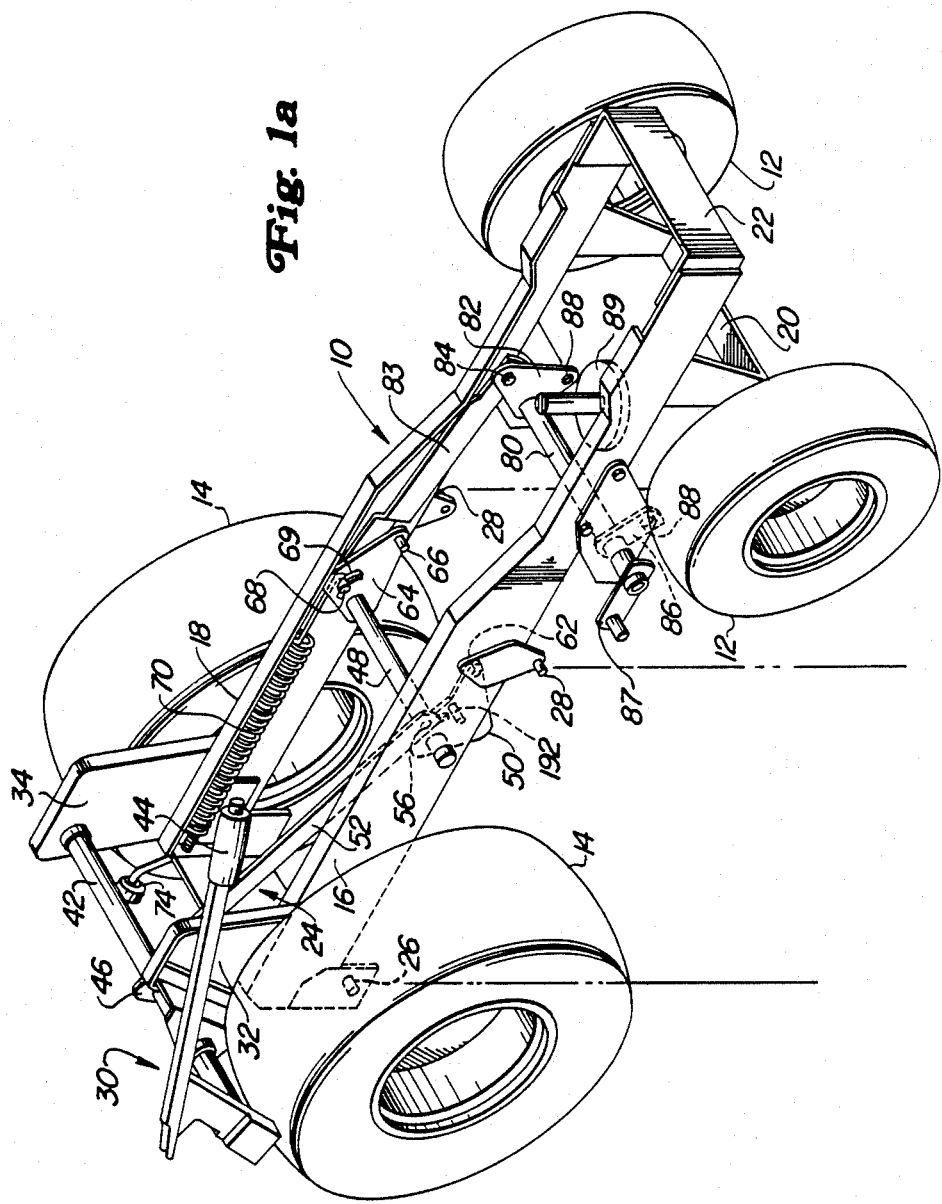
FIGS. 1a and 1b are somewhat schematic right front perspective views respectively of a lawn and garden tractor frame and lift system and of a rotary tiller showing the tiller-to-tractor frame mounting points.
Figure 2:
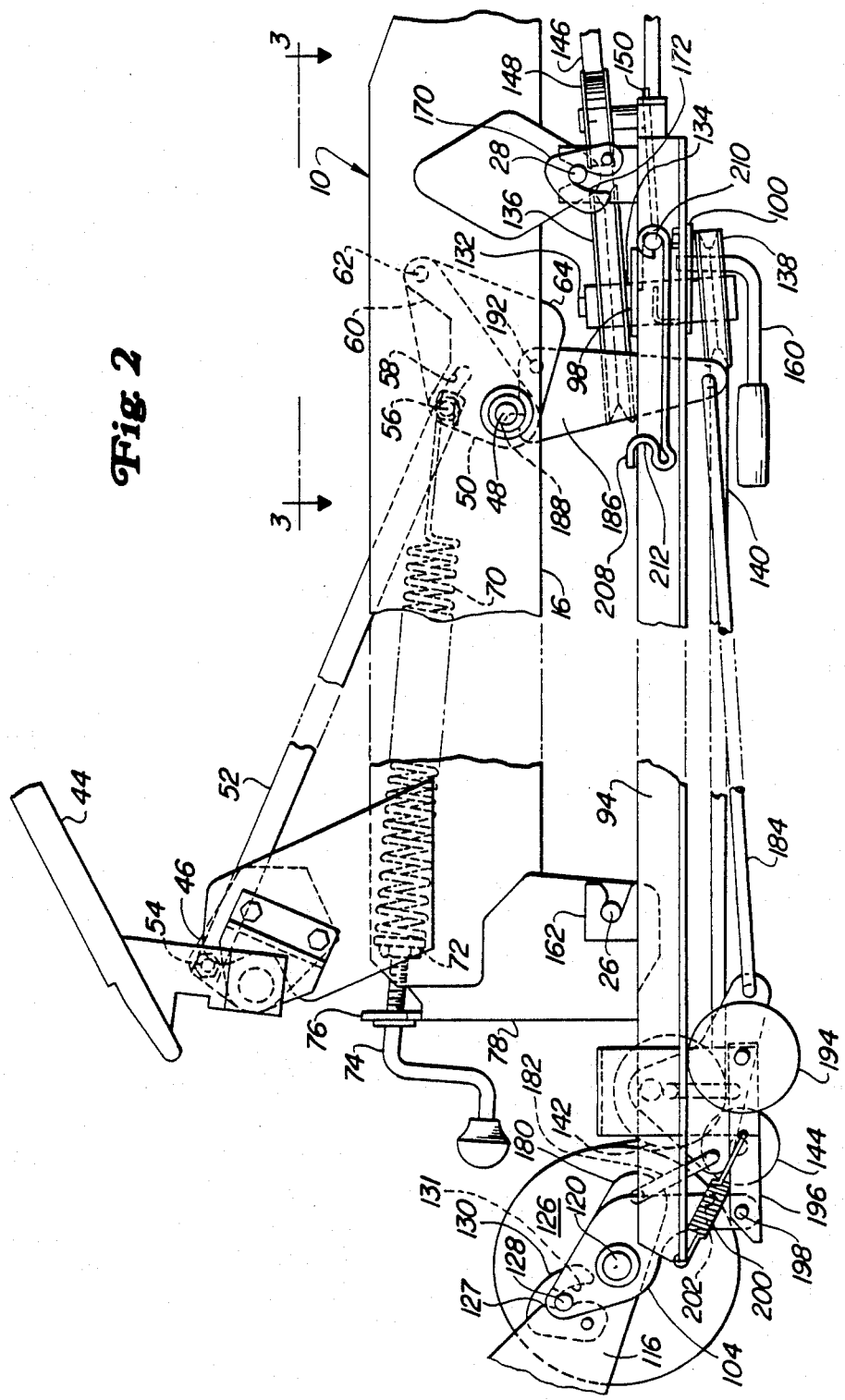
FIG. 2 is a right side elevational view illustrating the connections of the tiller frame to the tractor frame and the coupling of the tractor lift system with the tiller tine housing.

Referring now to FIGS. 1a and 2, there is shown a tractor frame 10 supported on front and rear pairs of wheels 12 and 14 and including transversely spaced, fore-and-aft extending right and left side beams 16 and 18 joined at their forward ends by a front cross member 20 and a front end weight support bracket 22, and at their rear ends by a drawbar structure 24. A rear pair of implement mounting pins or studs 26 (only one visible) are respectively mounted in and project outwardly from opposite, fore-and-aft extending portions of the drawbar structure 24, the pins 26 being in axial alignment with each other. A forward pair of implement mounting pins or studs 28 are respectively mounted to the beams 16 and 18 and project outwardly like the pins 26 but are located approximately midway between opposite ends of the beams.

A manually operated lift system 30 is mounted to the tractor frame 10 for raising and lowering implements attached to the frame. Specifically, the lift system 30 includes a pair of upwardly projecting rockshaft supports 32 and 34 respectively having lower end portions welded to outer rear surface portions of the beams 16 and 18. A horizontal, transverse rockshaft 42 is rotatably mounted in the supports 32 and 34. A lift handle 44 is secured to the right end of the rockshaft 42 and secured to the rockshaft at a location inwardly of the support 32 is a crank arm 46 in the form of a plate. A horizontal, transverse cross shaft 48 is rotatably mounted in the beams 16 and 18 at a location close to but spaced rearwardly from the forward pair of implement mounting pins 28. A bell crank 50 is fixed to a right end portion of the shaft 48 in fore-and-aft alignment with the crank arm 46 and a primary lift link 52 has its rear end pivotally coupled, as at pin 54 (FIG. 2) to the crank arm 46 and has its front end coupled, as at pin 56, to the bell crank 50, the pin 56 being located in an arcuate, lost-motion slot 58. The bell crank 50 includes a forwardly projecting leg 60 having an inwardly projecting pin or stud 62 fixed thereto for receiving an end of a mower lift link (not shown). A crank arm 64, in the form of a triangular plate, is fixed to a leftward location of the cross shaft 48 and an inwardly projecting pin or stud 66 is fixed to a forward corner of the arm in axial alignment with the pin or stud 62. A connection pin 68 is located in a lost-motion slot 69 in an upper corner of the arm 64 and coupled to the pin 68 is the forward end of a lift assist spring 70 having its rearward end coupled to a spring retainer 72 provided with a threaded hole receiving a threaded end of a manually operable screw crank 74 that is rotatably mounted in a tab 76 fixed to and projecting upwardly from a transverse, vertical plate 78 forming part of the drawbar structure 24.

The lift system 30 includes a further horizontal transverse cross shaft 80 rotatably mounted in the frame beams 16 and 18 at a location spaced forwardly of the cross shaft 48. A crank arm 82 in the form of a rectangular plate is fixed to the shaft 80, adjacent its left end. A motion-transfer link 83 has its rear end coupled to the crank arm 64 by the pin 68 and its forward end coupled to the crank arm 82 by a pin 84. A crank arm 86 in the form of a strap is fixed to the shaft 80, interiorly of the right side beam 16, while a similar crank arm 87 is fixed to the right end of the shaft outside of the beam 16. Axially aligned connecting holes 88 are provided in the crank arms 82 and 86 for coupling an implement to the lift system as will be discussed below in more detail. A mounting pin is provided in the end of the crank arm 87 for attachment of an end of a gas spring (discussed below) for acting in addition to the spring 70 as a lift assist.

The tractor frame 10 also supports a tractor engine (not shown) having a vertically disposed crankshaft which carries a drive pulley 89 at its lower end in a forward location midway between the frame beams 16 and 18 at a level just below the bottoms of the beams.

Figure 1B:
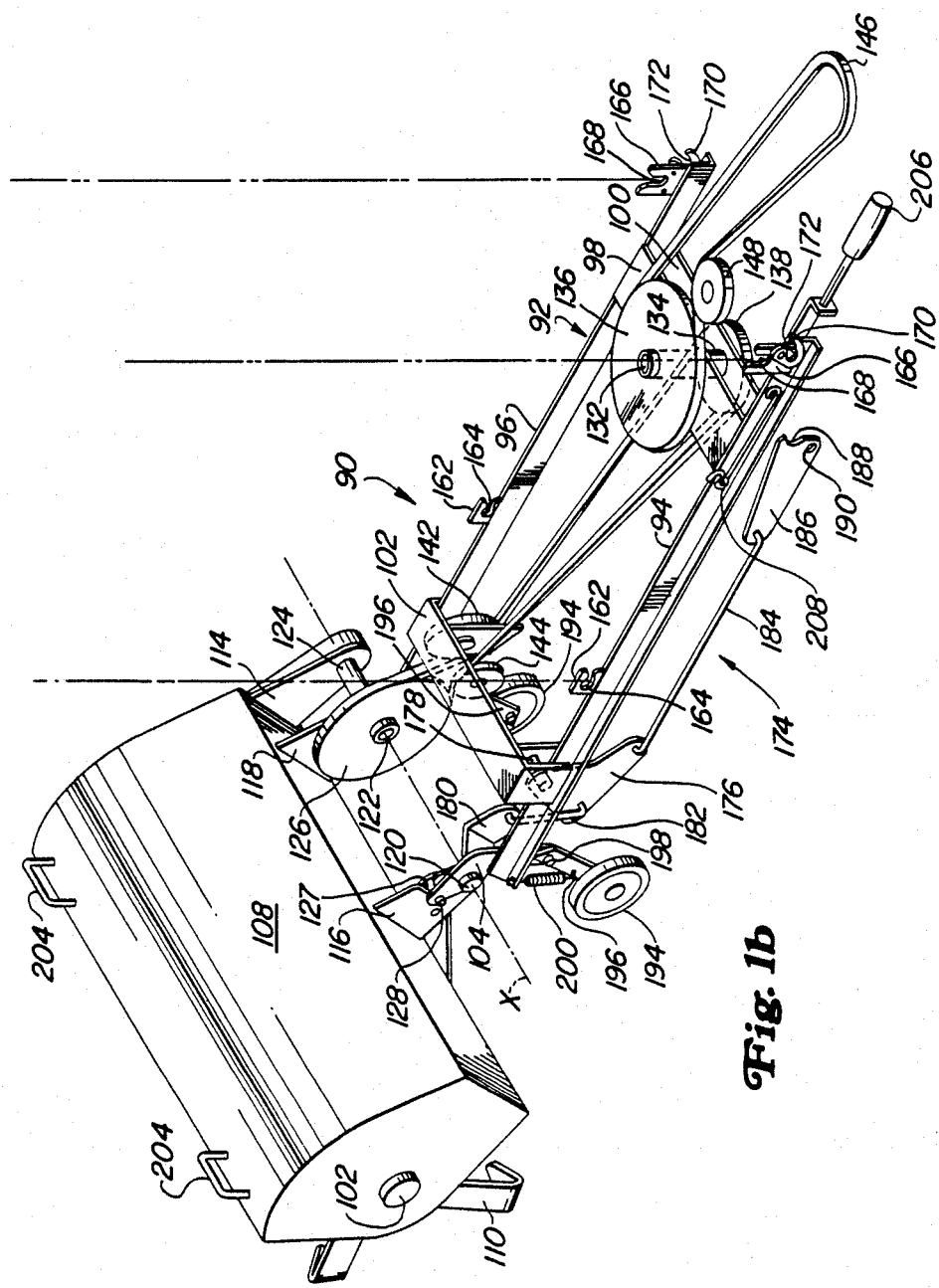

A rotary tiller 90 is shown (FIG. 1b) separated from the tractor frame 10 and locator lines are used for illustrating where the tiller attaches to the tractor frame. Specifically the tiller 90 includes a mounting frame 92 including transversely spaced, parallel, fore-and-aft extending, right and left side members 94 and 96 joined together adjacent their forward ends by upper and lower plates 98 and 100, respectively, and adjacent their rearward ends by a U-shaped plate 102, with central portions of the plates being substantially horizontal when the side members 94 and 96 are horizontal. Right and left brackets 104 are respectively secured to rear ends of the side members 94 and 96 (only the right bracket is visible). A tiller blade housing 108 containing a tine assembly 110 is located behind and extends transversely to the side members 94 and 96. The tine assembly 110 includes a drive shaft 112 having a left end (not shown) projecting through a left end wall of the housing 108 and carrying a chain sprocket. The left end wall of the housing includes a portion 114 which projects forwardly in parallel relationship to right and left mounting plates 116 and 118, respectively, that are integral with the blade housing 108 and are pivotally connected to the brackets 104 so as to establish a horizontal, transverse axis X about which the housing is swingable vertically between a raised transport position and a lowered tilling position. Specifically, the axis X is defined by a pivot pin 120 extending through the right bracket 104 and the mounting plate 116, and a drive shaft 122 extending through the left bracket 104 and the mounting plate 118 and being rotatably received in a tube 124 having opposite ends welded to the mounting plate 118 and the housing end wall portion 114. A driven pulley 126 is carried by an inner end of the shaft 122 and a chain sprocket (not shown) is carried by an outer end of the shaft in a location in fore-and-aft alignment with the tiller shaft chain sprocket and a drive chain is coupled between the sprockets. For the purpose of facilitating the mounting of the tiller 90 to the tractor frame 10, in a manner described below, it is desirable to prevent the tiller housing 108 from pivoting relative to the mounting frame 92. This is accomplished by providing the upper edges of the mounting plates 116 with a pin receptacle or notch 127 and providing the right bracket 104 with an inwardly projecting latch pin 128 located for being received in the notch when the housing 108 is raised as shown in FIGS. 1b and 2. A latch 130 is pivotally mounted on the plate 116 and contains a pin receptacle 131 which is shaped to capture the pin 128 within the notch 127 when the latch is rotated to its illustrated latch position.

Figure 3:
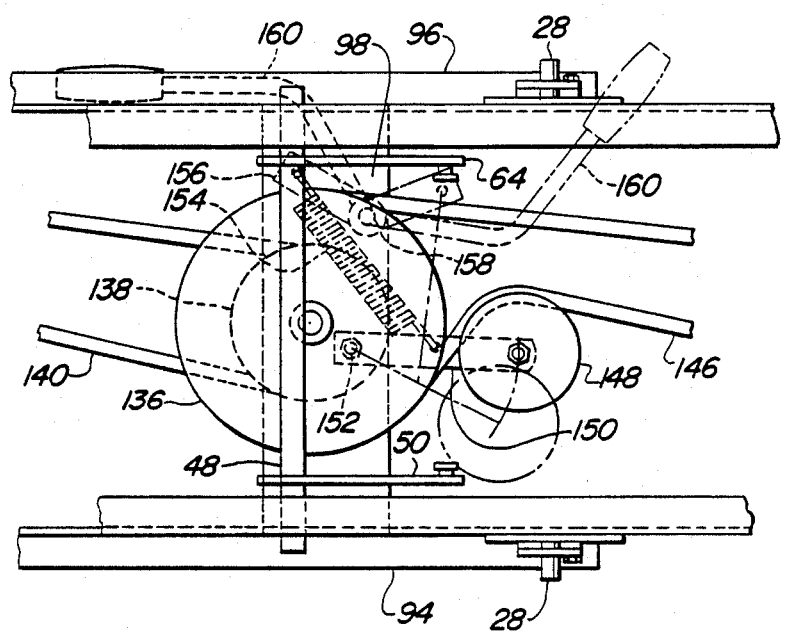
FIG. 3 is a top plan view showing the tiller drive belt drive engaging and disengaging mechanism.
Figure 7:
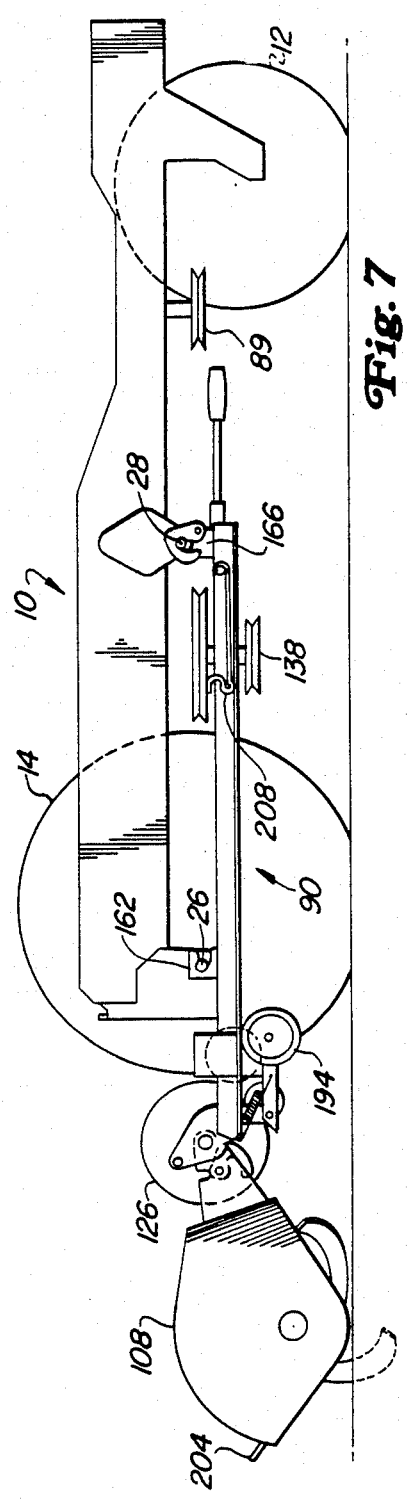

An upright drive shaft 132 is rotatably mounted in a sleeve 134 which is fixed to and projects through a central location of the plates 98 and 100. Primary and secondary drive pulleys 136 and 138 are respectively fixed to upper and lower ends of the shaft 132. A secondary drive belt 140 is provided for delivering power between the secondary drive pulley 138 and the pulley 126 and for this purpose is received about the pulleys 138 and 126 and guided through a ninety degree twist by means of first and second idler pulleys 142 and 144 respectively mounted to the frame 92, adjacent the pulley 126, for rotation about respective horizontal axes canted relative to the direction of travel and being respectively engaged with top and bottom sides of opposite runs of the belt 140. A primary drive belt 146 is received about the pulley 136 and is arranged for engaging the tractor drive pulley 89 when the tiller is mounted to the tractor frame as shown in FIG. 7. As can best be seen in FIG. 3, an idler pulley 148 is carried by an idler arm 150 that is pivotally mounted to a central region of the upper plate 98 by a pivot pin 152. A tension spring 154 has a first end connected to the idler arm 150 and a second end connected to a tension-release lever 156 pivotally connected, as at 158, to a left region of the lower plate 100 and including a hand lever 160.

The tiller 90 includes means for coupling it to the tractor frame 10 and to the lift system 30. Specifically, a rear pair of connection brackets 162 is respectively joined to and project upwardly from inner surfaces of the frame side members 94 and 96 at locations spaced forwardly of the U-shaped plate 102. The brackets 162 define respective forwardly opening receptacles 164 adapted for receiving the rear pair of implement mounting pins 26. A front pair of connection brackets 166 are respectively joined to and project upwardly from outer surfaces of forward end locations of the frame side members 94 and 96. The brackets 166 define respective upwardly opening receptacles 168 adapted for receiving the forward pair of implement mounting pins 28. A pair of latches or clips 170 are respectively vertically pivotally mounted to the brackets 166 and define receptacles 172 that are adapted for pivoting downwardly over and upwardly from the mounting pins 28 for respectively capturing the brackets 166 on and releasing the brackets 166 from the mounting pins 28.

A secondary lift linkage 173 is provided on the tiller 90 for transmitting the motion of the tractor lift handle 44 to the tiller blade housing 108 for selectively adjusting the latter about the axis X when the tiller is mounted on the tractor frame 10, as described below. The lift linkage 174 includes a somewhat triangular bell crank 176 having an upward corner vertically pivotally mounted, as at pin 178, to the right side of the U-shaped plate 102. A rearward corner of the bell crank 176 is coupled to a forward extension 180 of the right mounting plate 116 by a link 182 in the form of a rod having transversely bent ends pivotally received in respective holes provided in the bell crank and forward extension. A motion-transfer link 184, in the form of a rod, has a transversely bent rear end received through a hole located in a forward corner of the bell crank 176 and has a transversely bent forward end pivotally received in a first end of a lever 186. The lever 186 has an arcuate recess 188 in a second end thereof located beside a mounting hole 190. Referring to FIG. 2, it can be seen that when the tiller 90 is mounted on the vehicle frame 10, the recess 188 of the lever 186 embraces the cross shaft 48 while the hole 190 is received on a pin 192 carried by the crank arm 64.

Provided for supporting the weight of the tiller 90 when the latter is being mounted to or disconnected from the tractor frame 10 are right and left transport wheels 194 respectively mounted to first ends of a pair of wheel support arms 196. The pair of arms 196 are respectively vertically pivotally mounted, as at a pair of pivots 198 (only one shown), to downwardly projecting ends of the brackets 104 and 106. A pair of overcenter springs 200 have first ends respectively coupled to the pair of arms 196 and second ends coupled to the rear ends of frame side members 94 and 96. The springs 200 are so located relative to the pivots 198 that when the wheels are in their lowered transport position, as shown in FIG. 1b, the springs bias the arms clockwise and hold upper ends thereof in engagement with a pair of stop pins 202 (only one shown), respectively, fixed to and projecting inwardly from the brackets 104 and 106. The arms 196 are swingable counterclockwise from the stop pins 202 to locate the wheels 194 in raised stored positions, as shown in FIG. 2, this movement of the arms resulting in the spring 200 moving overcenter relative to the pivots 198 and then acting to maintain the wheels 194 in their stored positions.

Figure 6:
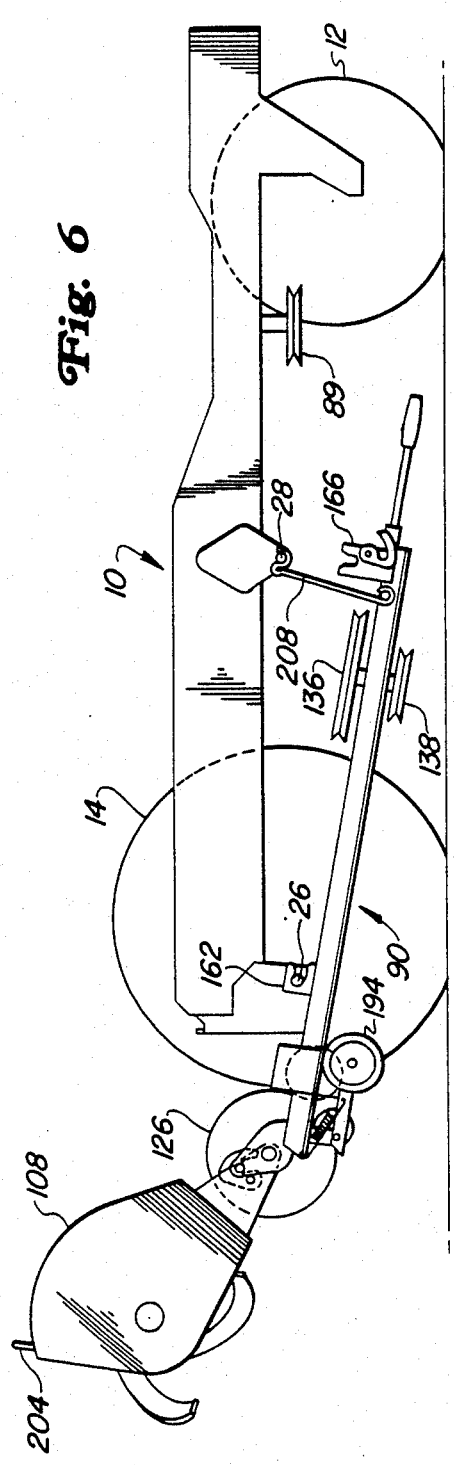

The location of the wheels 194 on the tiller 90 is selected such that the center of gravity of the tiller is located approximately in the same vertical transverse plane that the wheels are located when the wheels are in their lowered transport position. This makes it possible for a person to easily rock the tiller 90 about the support wheels by lifting or pushing down on a pair of handles 204 provided on the tiller blade housing 108 or by lifting or pushing down on an arm or handle 206 fixed to and projecting forwardly from the forward end of frame right side member 94. Also mounted to a forward end location of the side member 94 for aiding in the mounting of the tiller 90 to the tractor frame 10 is a prop rod 208 having one end formed into an eye received on a transverse pivot pin 210 and a second end formed into a U-shape defining a receptacle 212 located for being raised into engagement with the right implement mounting pin 28 (FIG. 6) after the rear pair of connection brackets are received on the rear pair of implement mounting pins 26 and the arm 206 is pushed down to pivot the mounting frame 92 about the pins 26 to elevate the wheels 194 from the ground, as shown in FIG. 6.

In mounting the tiller 90 on the tractor frame 10, an operator will grasp the handles 204 and maneuver the tiller about on the wheels 194 so that the housing 108 is disposed behind the tractor frame 10 with the tiller frame 92 extending between the rear tractor wheels 14 and beneath the tractor chassis, as shown in FIGS. 4 and 5. The operator, after making sure the rear pair of connection brackets 162 are aligned with the rear pair of implement mounting pins 26, will roll the tiller 90 forwardly until the pins 26 enter the receptacles 164, as shown in FIG. 6. The operator will then walk to the forward end of the tiller 90 and push down on the handle 206 so as to elevate the wheels 194 from the ground. The prop rod 208 is then elevated to position the receptacle 212 thereof beneath the right implement mounting pin 28 and the handle 206 released to permit the weight of the tiller rearwardly of the rear mounting pins to seat the receptacle 212 on the pin 28. The operator then returns to the rear of the tractor frame 10 and pivots the transport wheels 194 to their raised, stored position, as shown in FIGS. 2 and 7, for example. Returning once again to the forward end of the tiller frame 92, the operator presses downwardly on the handle 206, lowers the prop rod 208 and permits the forward end of the frame 92 to swing upwardly to engage the receptacles 168 of the front pair of connection brackets 166 with the forward pair of implement mounting pins 28. The pair of latches 170 are then rotated into place to secure the forward end of the frame 92 to the tractor frame 10. The primary drive belt 146 is then engaged with the tractor drive pulley 89 and properly tensioned through manipulation of the idler arm 150 via the hand lever 160. Next, the secondary lift linkage 174 is coupled to the tractor lift system 30 by hooking the lever 186 onto the pin 192 of the lift linkage with the recess 188 engaged with the shaft 48.

At this time the lift assist spring 70 of the tractor lift system 30 will normally be unloaded and the operator will load the spring by rotating the screw crank 74 in the appropriate direction. The latches 124 and 126 holding the tiller blade housing 108 rigid with the tiller frame 92 are then released to permit the housing to be adjusted about the axis X by manipulating the lift handle 44. The tiller 90 is then ready for operation.

The above noted procedure for mounting the tiller 90 on the tractor frame 10 is merely reversed when it is desired to disconnect the tiller from the frame.

Figure 8:
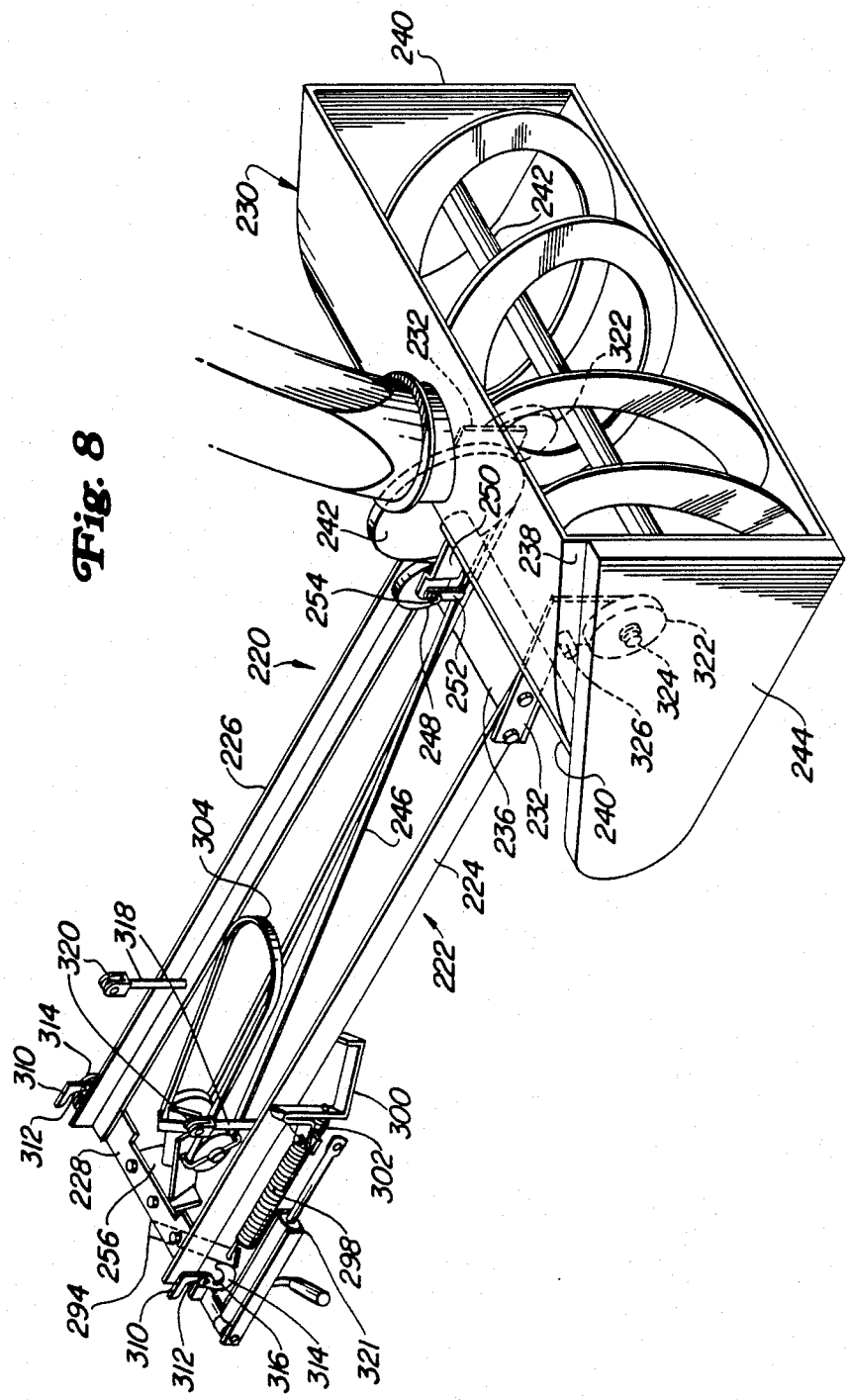
Figure 9:
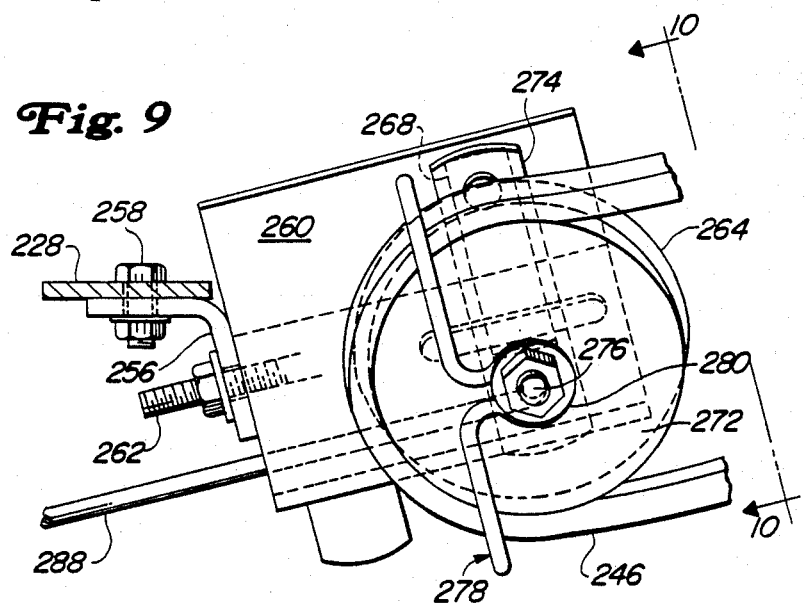
FIG. 9 is a right side elevational view of a rear set of adjustable idler pulleys of the snowblower drive.
Figure 10:
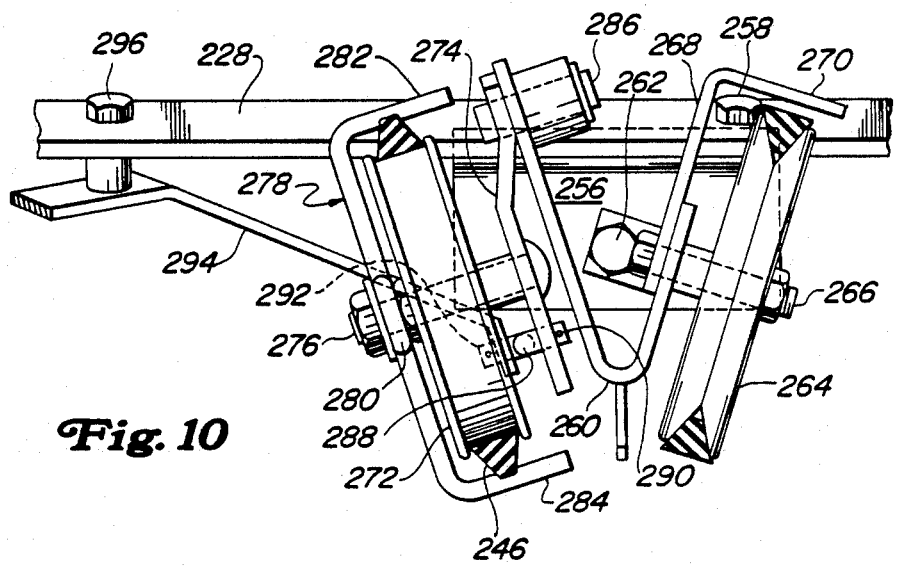
FIG. 10 is a rear elevational view of the idler pulley taken along line 10—10 of FIG. 9.

Referring now to FIG. 8, there is shown a front-mounted, driven implement, namely a snowblower 220, shown in a condition for being rolled rearwardly between the front tractor wheels 12 for attachment to the frame 10. Specifically, the snowblower 220 includes a mounting frame 222 including right and left side members 224 and 226, respectively, joined together at their rearward ends by a cross member 228 and at their forward ends by a structure forming a lower rear portion of a rotor housing 230 and including a pair of rearwardly projecting straps 232 bolted to the frame side members. A plate 236 is welded to the bottoms of the straps 232 to provide extra strength and to shield drive components located thereabove, as described below. The rotor housing 230 has right and left end walls 238 and 240, respectively, in which opposite ends of a rotor shaft 242 are journalled, the right end of the shaft extending beyond the right end wall 238 and having a drive sprocket (not shown) fixed thereto. Mounted to the back side of the housing 230 by a pair of transversely spaced brackets (not shown) is a horizontal transverse tube 240 which rotatably receives a countershaft (not shown) having a sprocket (not shown) fixed to its right end and a driven V-belt pulley 242 fixed to its left end. A drive chain (not shown) is located within a housing 244 at the right end of the rotor housing 230 and is engaged with the sprockets carried by the countershaft and rotor shaft. A drive belt 246 is received about the pulley 242 and an idler pulley 248, carried by an arm 250 fixed to the tube 240 adjacent the inner surface of the pulley 242, is located adjacent a rear peripheral portion of the pulley 242 and is engaged with an upper run of the belt 246. A belt guide 252 is carried by a bolt 254, extending through the arm 250 and providing a rotation axis for the idler pulley, and extends beneath an upper run of the belt 246. Referring now also to FIGS. 9 and 10, there is shown an L-shaped angle member 256 secured to the snowblower mounting frame cross member 228 by a pair of bolts 258. A V-shaped idler pulley mounting bracket 260 is mounted to the member 256 by a fore-and-aft extending, belt tension adjustment bolt 262. A right idler pulley 264 is mounted to the bracket 260 by a bolt 266 which also serves to secure a belt retainer 268 in place. The belt retainer 268 is shown in the form of an L-shaped strap having an end 270 disposed above the pulley 264. A left idler pulley 272 is mounted to a central location of a lever 274 by a bolt 276 which also serves to secure a belt retainer 278 in place. The belt retainer 278 is in the form of a rod having a central looped portion 280, engaged by the bolt 276, and upper and lower end portions 282 and 284 respectively disposed above and below the pulley 272. An upper end of the lever 274 is pivotally connected to an upper end of one of the legs of the bracket 260 by a pin 286. A belt tension control linkage includes a rod 288 having an inturned forward end 290 received in a hole provided in the lower end of the lever 274 and an outturned rearward end 292 received in a hole provided in an inner end of a lever 294 pivotally mounted on an upright pin 296 mounted to the cross member 228. An outer end of the lever extends beyond the right frame member 224 and is coupled to the rear end of an overcenter spring 298 having its forward end coupled to an operating lever 300 mounted for pivoting about an upright pin 302 carried by the frame side member 224.

The belt 246 is twisted through ninety degrees as it extends rearwardly from the upright pulley 242 and the idler 248 with respective runs thereof extending under, then forwardly over the idler pulleys 264 and 272 to form a forwardly projecting portion 304 adapted for being received about the tractor drive pulley 89. The belt retainers 268 and 278 keep the belt 246 in place when the snowblower 220 is disconnected from the tractor frame 10, as shown, so that it is properly disposed for being reconnected to the tractor drive upon completion of the mounting of the snowblower to the tractor frame 10. In this way, the retainers help to prevent the belt 246 from being accidentally trained about the idlers in a way which would result in backwards rotation of the snowblower impeller.

The snowblower frame 222 is provided with a pair of attachment brackets 310 respectively fixed to the rear ends of the frame side members 224 and 226 and having rearwardly opening receptacles 312 adapted for receiving the tractor frame mounting pins 28. Latches 314 are pivotally mounted to the brackets 310 and contain receptacles 316 for selective engagement with the pins 28 for retaining them in the mounting bracket receptacles 312. Provided for connecting the snowblower frame 222 to the tractor lift system 30 so the latter may be operated to rock the snowblower frame about a pivot axis defined by the pins 28 are a pair of suspension or lift rods 318 respectively projecting upwardly through the frame side members 224 and 226 at locations spaced forwardly of the rear ends of the members. The upper ends of the rods 318 are defined by clevises 320 adapted for connection to the crank arms 82 and 86 by inserting pins through the clevises and the holes 88 provided in the crank arms. Projecting rightwardly from the forward end of the frame 222 is a pin which provides a pivotal support for the cylinder end of a gas spring 321 adapted for connection to the crank arm 87 of the tractor lift system. The gas spring 321 serves to augment the lift assist spring 70.

A pair of transport wheels 322 are mounted, as at pins 324, to the members 232 at respective locations adjacent the rotor housing 230. The wheels 322 are located so as to be at or near a transverse, vertical plane passing through the center of gravity of the snowblower 220. Thus, a person mounting the snowblower to the tractor frame 10 can easily rock the snowblower about the wheels and maneuver it about on the wheels during mounting the snowblower to and disconnecting the snowblower from the tractor frame. Pins 326 are provided for allowing the wheels 322 to be stored out of the way when the snowblower is being operated.

Mounting of the snowblower 220 to the tractor frame 10 is effected in a manner having some similarity to that described above for mounting the tiller to the frame even though the snowblower is mounted so that its working parts are located ahead of the tractor. Specifically, mounting of the snowblower 220 to the tractor frame is accomplished by parking the tractor on a relatively hard, flat surface, grasping the snowblower rotor housing 230 at a forward upper location and maneuvering the snowblower about on its transport wheels 322 so as to place the frame 222 between the tractor wheels 12 with the mounting bracket receptacles 312 engaged with the mounting pins 28 of the tractor frame. The latches 314 are then pivoted to latch the brackets 310 to the pins 28. Next, the suspension rods 318 are coupled to the crank arms 82 and 86 and the counterbalance or lift assist spring 321 is coupled to the crank arm 87. Next the spring 70 is tensioned by operation of the handle 74. The lift handle 44 is then operated to raise the snowblower wheels 322 off the support surface whereupon the wheels may be removed and re-installed on the storage pins 326. The drive belt portion 304 is then engaged with the tractor drive pulley 89 and the belt tension control lever 300 is operated to effect movement of the idler pulley 272 to properly tension the drive belt 246 for operation.

Referring now to FIG. 11, there is shown a non-driven implement in the form of a blade assembly 330 including a frame 334 comprising right and left fore-and-aft extending side members 332 and 336 joined at their rear ends by a cross member 338 and at their forward ends by a blade-mounting structure 340 A blade 342 is provided at its back side with a mounting bracket defined by upper and lower mounting plates 344 and 346 disposed in sandwiching relationship to the frame structure 340 and coupled thereto by an upright pivot pin 348. Blade angle adjustment holes 350 are arranged in the plates 344 and 346 in an arc about the pivot pin 348 and a latch pin 352 is provided for securing the blade 342 in a desired position. Provided for mounting the blade frame 334 to the tractor frame 10 is a pair of mounting brackets 354 respectively fixed to the rear ends of the side members 332 and 336 and including rearwardly opening receptacles 356 adapted for receiving the tractor frame mounting pins 28. A pair of latches 358 is respectively pivotally mounted to the brackets 354 and include receptacles 360 adapted for being selectively engaged with the pins 28 for latching the frame 334 to the tractor frame. Spaced forwardly of the brackets 354 are a pair of suspension or lift rods 362 projecting upwardly through the side members 332 and 334 and having clevises 364 at their upper ends. The clevises 364 are adapted for receiving a pin for securing the rods 362 to the crank arms 82 and 86 of the tractor lift system 30.

Provided for aiding in the mounting of the blade assembly 330 to the tractor frame 10 are a pair of transport wheels 366 mounted to legs 368, depending from the structure 340, by pins 370. The wheels 366 are located so as to be at or near a vertical transverse plane passing through the center of gravity of the blade assembly 330. Thus, the location of the wheels 366 makes it easy for a person to rock the blade assembly 330 about the wheels and maneuver it into position for mounting it to and removing it from the vehicle frame 10. The wheels 366 may be removed and re-installed on a pair of storage pins 372, located above the pins 310, to keep the wheels out of the way when the blade assembly is being operated.

Mounting of the blade assembly 330 to the tractor frame 10 is accomplished by grasping the top edge of the blade 342 and rocking the blade assembly about the wheels 366 and pushing the blade assembly to maneuver the frame 334 between the tractor wheels 12 and to engage the brackets 354 with the tractor frame mounting pins 28. The latches are then pivoted into engagement with the pins 28 so as to lock the rear end of the blade frame 334 in place. The suspension or lift rods 364 are then connected to the tractor lift system 30 by inserting pins through the clevises 364 and crank arms 82 and 86. Next the counterbalance spring 70 is tensioned by turning the crank handle 74. The lift handle 44 is operated to lift the blade assembly about the pins 28. The wheels 366 are now held off the ground and can easily be removed and stored on the pins 372 if desired.

Thus, it will be appreciated that the tiller 90, snowblower 220 and blade assembly 330 all have in common the idea of providing transport wheels on an implement frame in a location close enough to the center of gravity of the implement that the implement, when detached from the tractor frame, may be easily rocked for complete support by and maneuvered upon the transport wheels for facilitating the connection of the implement frame to the tractor frame.

We claim:

1. A combined lawn and garden tractor and implement structure for facilitating easy connection and disconnection of the implement to and from the tractor, comprising: a tractor frame supported on front and rear pairs of wheels; said frame supporting transverse implement mounting pin means; an elongate implement frame; a working tool mounted to the implement frame; mounting bracket means fixed to the implement frame and including receptacle means for selectively receiving the mounting pin means; transport wheel means mounted to the implement frame at a location at least adjacent a vertical transverse plane extending through a center of gravity of the implement and being so located relative to the mounting bracket means that when the implement is to be connected to the tractor frame the implement may be rolled on the transport wheel means to locate the implement frame between one of the front and rear pairs of tractor tires and beneath the tractor frame and rocked about the wheels to adjust the mounting bracket means vertically so as to bring the receptacle means into engagement with the mounting pin means.

2. The combined lawn and garden tractor and implement structure defined in claim 1 wherein said implement includes a tool mounted to a forward end of said implement frame; said mounting pin means being located on said tractor frame at a fore-and-aft location intermediate said front and rear pairs of wheels; and said bracket means including a pair of transversely spaced brackets fixed to a rear end of said implement frame and having rearwardly opening receptacles receiving said mounting pin means and adapted for being removed from the mounting pin means by rolling the implement frame forwardly on its support wheel means.

3. The combined lawn and garden tractor and implement structure defined in claim 2 wherein said implement frame includes right and left fore-and-aft extending side members joined at their rear ends by a cross member and respectively having said pair of transversely spaced brackets fixed to the rear ends thereof.

4. The combined lawn and garden tractor and implement structure defined in claim 2 wherein said transport wheel means is mounted adjacent said tool.

5. The combined lawn and garden tractor and implement structure defined in claim 2 wherein said tool is a blade.

6. The combined lawn and garden tractor and implement structure defined in claim 2 wherein said tractor includes a drive pulley driven about a vertical axis and located ahead of the mounting pin means; said tool including a housing having a horizontal drive shaft rotatably mounted therein; said implement including drive means coupled to said shaft and including a horizontal, transverse countershaft arranged rearwardly of said housing and having a driven pulley mounted on one end thereof; a drive belt received on said driven pulley; a first set of idler pulleys engaging the belt adjacent the driven pulley and being disposed to keep the belt engaged with the pulley; a second set of idler pulleys located adjacent the rear of said implement frame and having belt guide means associated therewith to maintain the belt in engagement therewith to define and maintain in place a forwardly projecting generally horizontal belt loop which is engaged with the tractor drive pulley.

7. The combined lawn and garden tractor and implement structure defined in claim 6 and further including belt tension control means; said second set of idler pulleys including a pulley mounted to the end of a lever having another end coupled to said belt tension control means with the latter being selectively operable to take-up or release slack in said belt loop to effect or release driving engagement between the belt and tractor drive pulley.

8. The combined lawn and garden tractor and implement structure defined in claim 2 wherein said mounting pin means defines a horizontal pivot axis about which said implement frame is pivotable; said tractor including manually operable lift means mounted to the tractor frame and coupled to said implement frame at a location spaced forwardly of said mounting bracket means for raising and lowering the implement frame for adjusting the elevation of the tool.

9. The combined lawn and garden tractor and implement structure defined in claim 1 wherein said working tool is mounted to a rearward end of said implement frame; said mounting pin means being positioned at a rear location of said tractor frame; said bracket means including a pair of transversely spaced brackets, fixed to the implement frame at a location spaced forwardly of a rear portion of the frame, and having forwardly opening receptacles receiving said pin means and being adapted for removal from the pin means by rolling the implement rearwardly on its transport wheel means; a further implement mounting pin means being fixed to said tractor frame at a fore-and-aft location intermediate the first and second pairs of wheels; said implement including a second mounting bracket means defining upwardly opening receptacle means releasably receiving said further implement mounting pin means; and the first-mentioned mounting pin means and transport wheel means being so located relative to the implement center of gravity and further implement mounting pin means that when the further implement mounting pin means is released from the second mounting bracket means the implement will be free to rotate about the first-mentioned mounting pin means but the weight of the implement will bias the second mounting bracket means against said further mounting pin means.

10. The combined lawn and garden tractor and implement structure defined in claim 9 wherein said implement is provided with a vertically pivotable prop member located adjacent said second mounting bracket means and pivotable to an upwardly extending prop position engaging said tractor frame when said second mounting bracket means is released from the second mounting pin means and is displaced downwardly away from the latter by pivoting the implement frame about the first-mentioned mounting pin means; and said transport wheel means including pivotal mounting means permitting movement of the transport wheel means to and from a stored position when the prop member is in its prop position whereby during mounting and dismounting of the implement to and from the tractor frame the transport wheels may respectively be rotated to and from the stored position.

11. The combined lawn and garden tractor and implement structure defined in claim 9 and further including a tractor drive pulley mounted for rotation about an upright axis located forwardly of said second mounting pin means; said tool including a housing having a horizontal drive shaft rotatably mounted therein; said implement including drive means coupled to said shaft and including a horizontal transverse countershaft mounted ahead of said housing and having a driven pulley mounted to one end thereof; an upright shaft rotatably supported on the implement frame adjacent the end thereof in general fore-and-aft alignment with the axis of rotation of the drive pulley upper and lower pulleys being mounted on upper and lower ends of the upright shaft; a primary drive belt extending about the upper pulley and tractor drive pulley and a secondary drive belt received about the lower pulley and the driven pulley; idler pulley means engaging said drive belt at locations adjacent the driven pulley and guiding the belt through a ninety degree twist and maintaining the belt in proper engagement with the lower and driven pulleys; and a tensioning idler pulley engaging said primary drive belt and being mounted to a lever pivotally mounted on the implement frame; and a tension control means coupled to said lever and operable for selectively effecting the taking up or releasing of slack in the primary drive belt for effecting driving or non-driving relationship between the drive pulley and primary drive belt.

12. The combined lawn and garden tractor and implement structure defined in claim 9 wherein said tool is vertically pivotally connected to the rear of said implement frame; lock means for locking the tool in a raised position and to the implement frame; lift linkage means carried by the implement frame and being coupled to the tool; and a tractor lift system carried by the tractor frame and including a transverse rockshaft having a crank arm fixed thereto and coupled to said lift linkage means for effecting raising and lowering of the tool when the lock means is released.

* * * * *